(No Model.)
J. H. PALMER.
BEARING FOR BICYCLES.
No. 360,470. Patented Apr. 5, 1887.
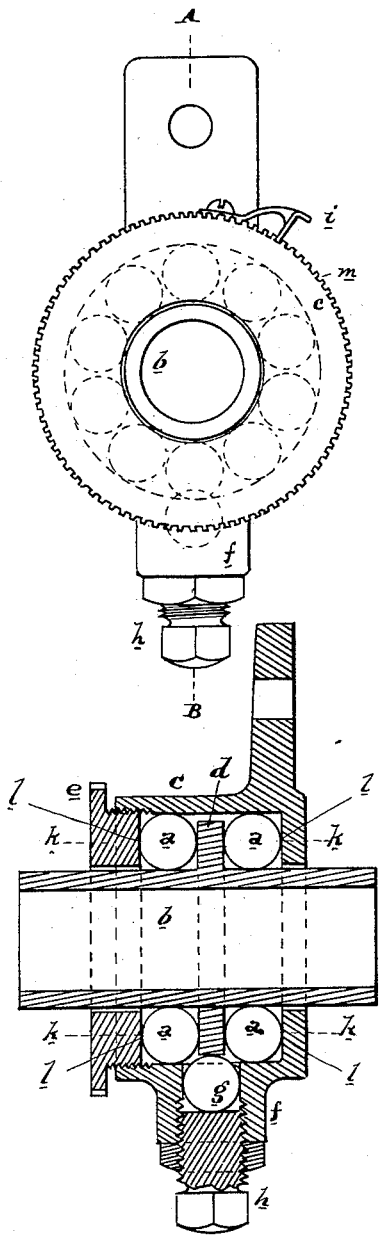
Attest
Inventor
John H. Palmer

UNITED STATES PATENT OFFICE.

JOHN H. PALMER, OF ROCKAWAY, NEW JERSEY.

BEARING FOR BICYCLES.

SPECIFICATION forming part of Letters Patent No. 360,470, dated April 5, 1887.

Application filed December 3, 1886. Serial No. 220,620. (No model.) Patented in England December 16, 1879, No. 5,145.

*To all whom it may concern:*

Be it known that I, JOHN H. PALMER, of Rockaway, county of Morris, and State of New Jersey, have invented an Improvement in Bearings for Bicycles, of which the following is a specification.

My invention has reference to bearings for bicycles and other vehicles; and it consists in certain improvements fully set forth in the following specification and shown in the accompanying drawings, which form part thereof.

This invention was patented to me on December 16, 1879, in England, which patent is No. 5,145. This English patent was taken out in joint names of Thomas Palmer and myself, but was solely my invention.

The object of my invention is to construct an anti-friction bearing suitable for velocipedes and other light-running vehicles, which shall be cheap to construct, durable in operation, and easily kept in adjustment.

In this bearing two or more rows of balls are introduced between the axle and journal, the said rows of balls being kept apart by a flange or flanges forming part of the axle or attached to the axle, the said flange or flanges being of equal thickness from the smallest to the largest diameter. The point of contact of the flange with each ball is consequently that of a plane with a sphere, the said points of contact being the axes upon which the balls revolve. The case or journal of the bearing is cylindrical in form and holds parallel relations to the axle. Therefore when the balls are placed between the axle and journal the points of contact of each ball with the axle and journal are constantly on the extreme diameter of the ball and on a line bisecting the center of the axle.

The bearing is adjusted to compensate for wear by two processes. First, the case or journal has a cap screwed in from one side. By pressing forward the said cap the balls are brought into contact with the flange or flanges and the sides of the case or journal, thus taking up lateral or side shake. Second, on the under side of the case or journal is a cylindrical projection, which is perforated toward the axle, so as to admit the introduction of a ball and screw. By pressing forward the said screw the ball is brought into contact with the axle or flange on the axle. Thus vertical shake can be taken up. It will be understood that the said cap may be held in position by any convenient means; but by preference I use a small spring, which is attached to the bearing and takes into suitable grooves cut round the edge of the cap.

That my invention may be better understood, I have annexed hereto drawings thereof, which I now proceed to describe.

Similar letters of reference denote the same parts in both the figures.

Figure 1 is a front elevation showing a bearing with the cap screwed in, and Fig. 2 is a section through the said bearing on the line A B.

$a$ $a$ $a$ $a$ are the balls placed between the axle $b$ and the journal C, kept apart from each other by the flange $d$. It will be seen that the point of contact of the balls with the flange and sides of journal are the axes $k$ $k$, upon which the balls revolve, and also that upon screwing forward the cap $e$ the balls $a$ are brought into contact with the flanges $d$ and the sides of the journal at the points $l$, and the bearing is contracted laterally. A ball, $g$, is placed in a chamber formed by perforating the projection $f$. Upon pressing forward the screw $h$ the ball $g$ is brought into contact with the flange $d$, and the bearing is contracted vertically. The spring-catch $i$ on the bearing takes into the notches $m$ around the cap $c$ and securely holds it in position.

Having now described my invention, what I claim as new, and desire to secure by Letters Patent, is—

1. The combination of the axle having a radial flange, an inclosing-journal case having end faces parallel to the flange on the axle, and two rows of balls, one in each annular space between the ends of the inclosing-journal and flange of the axle, substantially as and for the purpose specified.

2. The combination of the axle having a radial flange, an inclosing-journal case having end faces parallel to the flange on the axle and adjustable to or from each other, and two rows of balls, one in each annular space between the ends of the inclosing-journal and flange of the axle, substantially as and for the purpose specified.

3. The combination of the axle having a radial flange, an inclosing-journal case having end faces parallel to the flange on the axle and provided with a receptacle at the bottom, a ball in said receptacle and upon which the edge of the flange may rest, and two rows of balls, one in each annular space between the ends of the inclosing-journal and flange of the axle, substantially as and for the purpose specified.

4. The combination of the axle having a radial flange, an inclosing-journal case having end faces parallel to the flange on the axle provided with a receptacle at the bottom, a ball in said receptacle and upon which the edge of the flange may rest, an adjusting-screw to adjust the said ball to or from the flange, and two rows of balls, one in each annular space between the ends of the inclosing-journal and flange of the axle, substantially as and for the purpose specified.

5. The combination of the axle having a radial flange, an inclosing-journal case having end faces parallel to the flange on the axle adjustable to or from each other, provided with a receptacle at the bottom, a ball in said receptacle and upon which the edge of the flange may rest, an adjusting-screw to adjust the said ball to or from the flange, and two rows of balls, one in each annular space between the ends of the inclosing-journal and flange of the axle, substantially as and for the purpose specified.

6. The combination of the axle $b$, having flange $d$, the inclosing case or journal $c$, having one vertical wall arranged parallel to the flange $d$, the adjustable screw-cap $e$, for the opposite end of said journal, and two rows of balls, $a$ $a$, arranged between the flange $d$, cap $e$, and end face of journal, substantially as and for the purpose specified.

7. The combination of the axle $b$, having flange $d$, the inclosing case or journal $c$, having one vertical wall arranged parallel to the flange $d$, the adjustable screw-cap $e$, for the opposite end of said journal, and two rows of balls, $a$ $a$, arranged between the flange $d$, cap $e$, end face of journal, and a catch, $i$, to prevent the cap $e$ from accidentally turning, substantially as and for the purpose specified.

In testimony of which invention I hereunto set my hand.

JOHN H. PALMER.

Witnesses:
R. M. HUNTER,
WILLIAM C. MAYNE.